United States Patent
Ikegami

(10) Patent No.: US 7,100,448 B2
(45) Date of Patent: Sep. 5, 2006

(54) ACCELEROMETER

(75) Inventor: Naokatsu Ikegami, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 6 days.

(21) Appl. No.: 10/945,889

(22) Filed: Sep. 22, 2004

(65) Prior Publication Data

US 2005/0097958 A1  May 12, 2005

(30) Foreign Application Priority Data

Nov. 10, 2003  (JP) ............... 2003-379403

(51) Int. Cl.
  *G01P 15/12*  (2006.01)
(52) U.S. Cl. ................. 73/514.33; 73/514.38
(58) Field of Classification Search ............ 73/514.33, 73/514.16, 514.29, 514.36, 514.38
See application file for complete search history.

(56) References Cited

U.S. PATENT DOCUMENTS

| | | | | |
|---|---|---|---|---|
| 5,284,057 A | * | 2/1994 | Staller et al. | 73/514.36 |
| 5,351,542 A | * | 10/1994 | Ichimura et al. | 73/514.33 |
| 5,485,749 A | * | 1/1996 | Nohara et al. | 73/514.33 |
| 5,567,880 A | * | 10/1996 | Yokota et al. | 73/514.33 |
| 5,652,384 A | * | 7/1997 | Henrion et al. | 73/514.24 |
| 5,828,116 A | * | 10/1998 | Ao | 257/417 |
| 6,772,632 B1 | * | 8/2004 | Okada | 73/514.38 |
| 6,892,578 B1 | * | 5/2005 | Saitoh et al. | 73/514.33 |
| 2005/0097960 A1 | * | 5/2005 | Ikegami et al. | 73/514.36 |

FOREIGN PATENT DOCUMENTS

| | | |
|---|---|---|
| JP | 07-225240 | 8/1995 |
| JP | 11-248737 | 9/1999 |

* cited by examiner

*Primary Examiner*—Helen Kwok
(74) *Attorney, Agent, or Firm*—Rabin & Berdo, PC

(57) ABSTRACT

An accelerometer includes: a sensor chip including a weight portion for detecting a force imparted from outside, a frame portion that surrounds the weight portion, a beam portion that is deflectable and flexibly supports the weight portion, and a sensor element whose electric resistance varies depending on an amount by which the beam portion deflects; and a spacer provided at a position on a surface of a mounting substrate which position corresponds to the central portion of the weight portion. The sensor chip is mounted on the mounting substrate with a bottom surface of the frame portion being fixed at a predetermined position on the mounting substrate by an adhesive portion. The spacer has a thickness greater than that of the adhesive portion and may be formed by an adhesive concurrently with the adhesive portion, with a gap being maintained between the bottom surface of the weight portion and the spacer. The spacer serves to restrict an amount of downward movement of the weight portion which occurs when the beam portion deflects.

9 Claims, 2 Drawing Sheets

ACCELEROMETER

CROSS-REFERENCE TO RELATED APPLICATION

This application claims priority under 35 USC 119 from Japanese Patent Application No. 2003-379403, the disclosure of which is incorporated by reference herein.

BACKGROUND OF THE INVENTION

1. Field of the Invention

The present invention relates to an accelerometer, and particularly to an accelerometer manufactured by applying semiconductor micro-machining technology, and a package structure for the accelerometer.

2. Description of the Related Art

In recent years, a technique for manufacturing a microscopic structure having a size of several hundred micrometers or thereabouts by use of micro-machining that applies semiconductor micro-machining technology has drawn much attention. Applications of such microscopic structures to various types of sensors, optical switches used in the field of optical communication, high-frequency components and the like have been studied. Generally, such components that apply micro-machining are manufactured by using a silicon process, so that these components can be integrated into the same chips as those of an integrated circuit of a signal processing system. As a result, a system having one certain function can be formed with only a single chip. Thus, an element having the above function is referred to as Micro Electrical Mechanical System (MEMS) or Micro System Technology (MIST).

Components utilizing MEMS include an accelerometer that is widely applied to an air bag control apparatus for an automobile, an information measuring system of an underground environment such as seismic activity or the like, an earthquake-resistant system of information communication components, and the like. Such accelerometers have been disclosed in, for example, JP-A No. 7-225240 and JP-A No. 11-248737.

FIG. 2 is a cross-sectional view showing the structure of a conventional accelerometer disclosed in JP-A No. 7-225240. This accelerometer has a sensor chip 1 that detects an acceleration. The sensor chip 1 is formed by a peripheral frame 1a, an internal mass portion 1b, and two beams 1c that elastically support the mass portion 1b on the frame 1a in a cantilevered manner. These components are integrally formed with a silicon wafer by use of semiconductor manufacturing technology. A piezoelectric resistive element (not shown) whose resistance value varies depending on an amount of deflection occurring in the beam is formed on the upper surface of the beam 1c. The piezoelectric resistive element is connected to a connection pad on the upper surface of the frame 1a. A blocking portion 2 having the shape of a rectangular frame is provided in an outer peripheral region of the frame 1a of the sensor chip 1. Further, a glass cover 3 is bonded to the lower surface of the frame 1a.

A sensor main body comprised of the sensor chip 1, the blocking portion 2, and the cover 3 is placed on a mounting substrate 4, and thereafter, a connecting terminal of a detection circuit or the like, that is provided on the mounting substrate 4, and a connecting pad of the sensor chip 1 are connected by a bonding wire 5. Further, a resin portion 6 is formed extending from the blocking portion 2 in a manner to encapsulate the sensor chip 1 and the bonding wire 5. The blocking portion 2 is provided around the frame 1a so as to have the shape of a rectangular frame. Therefore, even when the accelerometer is molded by molding resin on the mounting substrate 4, the molding resin does not come into the frame 1a, and elastic displacement of the beams 1c or the mass portion 1b is not impeded.

In the aforementioned accelerometer, the sensor main body is protected by the resin portion 6. Therefore, an impact caused by dropping of the accelerometer is alleviated, and it is unlikely that the sensor may be broken. As a result, reliability can be raised. Further, heat distortion due to the environment, or the like is restrained by the resin portion 6, thereby improving the temperature characteristics.

However, in the aforementioned accelerometer, the sensor chip 1 is bonded to the glass cover 3, and the cover 3 is placed on the mounting substrate 4, and thereafter, these components are entirely sealed with the molding resin 6. For this reason, there exist problems that the thickness of the accelerometer becomes larger and a process for bonding the cover 3 is required, thereby increasing manufacturing costs.

On the other hand, if the sensor chip 1 is directly bonded onto the mounting substrate 4 without using the cover 3 for the purpose of cost reduction, a problem newly arises that an adhesive seeps out from the frame 1a and reaches the bottom of the mass portion 1b, thereby causing the mass portion 1b and the mounting substrate 4 to adhere to each other. If, in order to solve the aforementioned problem, a gap between the mass portion 1b and the mounting substrate 4 is made larger (for example, 50 µm), another problem arises that the amount of movement of the mass portion 1b due to an acceleration or the like may increase and the beams 1c that support the mass portion 1b may be broken.

SUMMARY OF THE INVENTION

It is an object of the present invention to provide an accelerometer having a small thickness and a high resistance to breakage and manufactured at a lower cost.

In accordance with a first aspect of the present invention, there is provided an accelerometer that comprises: a sensor chip including a weight portion that detects force imparted from outside, a frame portion that surrounds the weight portion, a beam portion that flexibly supports the weight portion by connecting an upper portion of the weight portion to an upper portion of the frame portion so that a bottom surface of the weight portion is placed at a position higher than the bottom surface of the frame portion by a predetermined amount, and a sensor element of which electric resistance varies depending on an amount by which the beam portion deflects; a mounting substrate on which the sensor chip is mounted by fixing the bottom surface of the frame portion of the sensor chip at a predetermined position by an adhesive portion having a predetermined thickness with an adhesive applied thereto; and a spacer that restricts an amount of movement of the weight portion in a downward direction, the spacer being formed by applying an adhesive similar to the adhesive portion at a position on the surface of the mounting substrate surface, which position corresponds to the central position of the weight portion of the sensor chip, by a thickness that is larger than the aforementioned predetermined thickness, with a predetermined gap being formed between the bottom surface of the weight portion and the spacer.

In accordance with a second aspect of the present invention, there is provided an accelerometer that comprises: a sensor chip including a weight portion that detects force imparted from outside, a frame portion that surrounds the weight portion, a beam portion that flexibly supports the weight portion by connecting an upper portion of the weight portion to an upper portion of the frame portion so that a bottom surface of the weight portion is placed at a position higher than the bottom surface of the frame portion by a predetermined amount, and a sensor element of which electric resistance varies depending on an amount by which the beam portion deflects, a receptacle that is formed by an exterior frame portion and a bottom portion and has a space that is as large as that allows accommodation of the sensor chip, in which the sensor chip is mounted and disposed within the space in such a manner that the bottom surface of the frame portion of the sensor chip is fixed to the bottom portion by an adhesive portion having a predetermined thickness with an adhesive applied thereto, and a spacer formed by applying an adhesive similar to the adhesive portion at a position on the bottom surface of the receptacle, which position corresponds to the central position of the weight portion of the sensor chip, by an amount of a predetermined thickness that is larger than the aforementioned predetermined thickness, with a predetermined gap being formed between the bottom surface of the weight portion and the spacer, the spacer being provided so as to restrict an amount of movement of the weight portion in a downward direction.

In accordance with a third aspect of the present invention, there is provided an accelerometer that comprises: a sensor chip including a square column-shaped central weight portion and square column-shaped peripheral weight portions respectively connected to four corners of the central weight portion, which weight portions are provided for detecting force imparted from outside, a rectangular parallelepiped-shaped frame portion that surrounds the central weight portion and peripheral weight portions, four beam portions which flexibly support the central weight portion by connecting upper portions of four sides of the central weight portion respectively to upper portions of four sides of the frame portion so that a bottom surface of the central weight portion is placed at a position higher than the bottom surface of the frame portion by a predetermined amount, and a sensor element whose electric resistance value varies depending on an amount by which the beam portions deflect, all of which components are integrally formed on a semiconductor substrate, a mounting receptacle formed by an exterior frame portion and a bottom portion and having a space that is about as large as that containing the sensor chip therein, the receptacle being provided in such a manner that the sensor chip is disposed and mounted in the space by fixing the bottom surface of the frame portion of the sensor chip at a predetermined position on the bottom surface by an adhesive portion having a first thickness and an adhesive applied thereto; and a spacer formed, by applying an adhesive similar to the adhesive portion of the frame portion, as one pattern, by an amount of a second thickness larger than the first thickness at the same time as with the adhesive portion, at a position on the bottom surface of the receptacle, which position corresponds to the central position of the central weight portion of the sensor chip, with a predetermined gap being formed between the bottom surface of the central weight portion and the spacer, the spacer being provided so as to restrict an amount of movement of the central weight portion in a downward direction.

In the present invention, a spacer is formed, by applying the same material as the adhesive by a predetermined thickness, on a mounting substrate to which the frame portion of the sensor chip is fixed and at a position corresponding to the central position of the weight portion of the sensor chip. As a result, even if the distance between the weight portion of the sensor chip and the mounting substrate is set to be larger, an amount of movement of the weight portion in the downward direction is limited by the spacer. Therefore, there is no danger of the beam portion being damaged. Due to the distance between the weight portion and the mounting substrate being set to be larger, there is no possibility that, when the sensor chip is fixed to the mounting substrate, the adhesive seeps out and reaches the lower region of the weight portion, and the weight portion and the mounting substrate may be bonded to each other. Accordingly, no conventional glass cover is required, and an accelerometer having a small thickness and a high resistance to breakage and manufactured at a lower cost can be obtained.

The foregoing and other objects and novel features of the invention will become apparatus more completely from the following description of preferred embodiments taken in connection with the accompanying drawings. However, these drawings are intended to be only illustrative, but are not intended to be construed as narrowing the scope of the invention.

DETAILED DESCRIPTION OF THE INVENTION

Figure 1A:
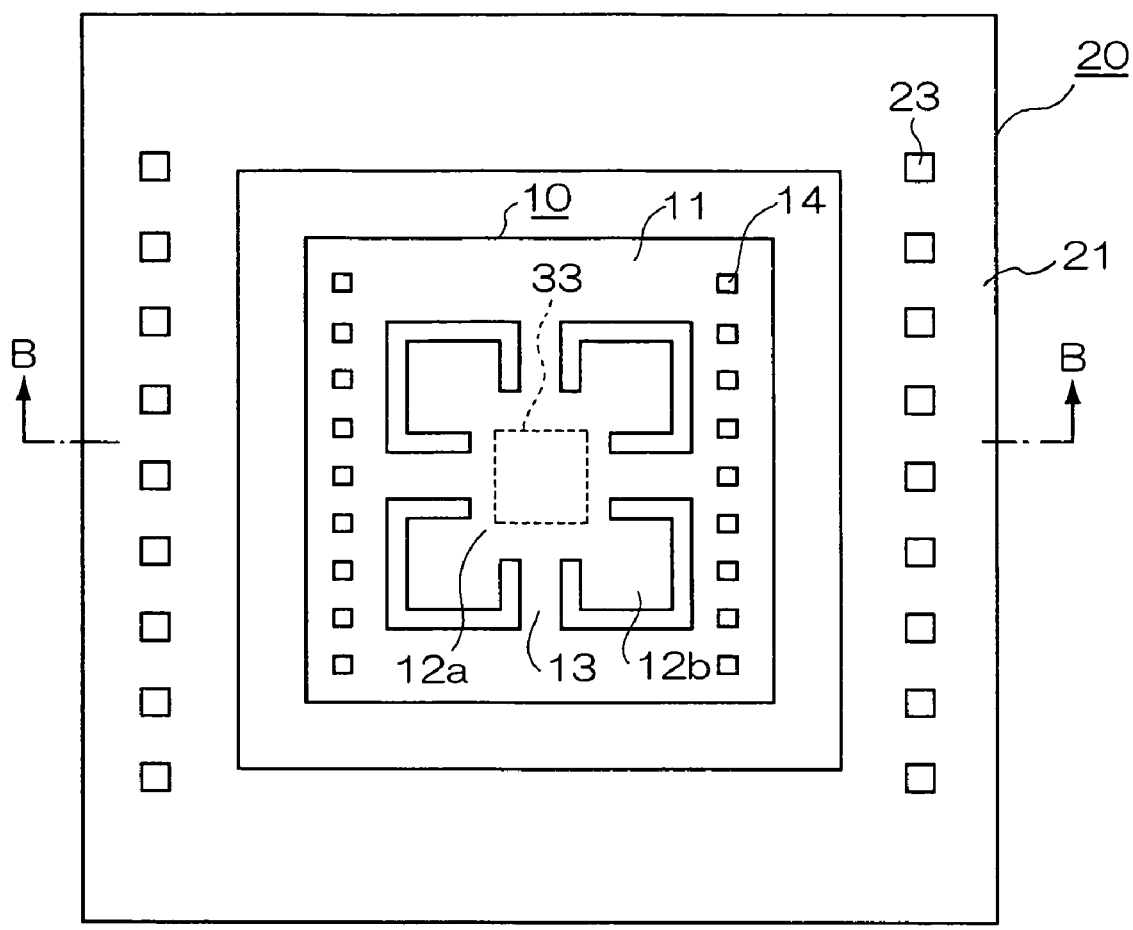
FIG. 1A is a structural diagram of an accelerometer showing an embodiment of the present invention.
Figure 1B:
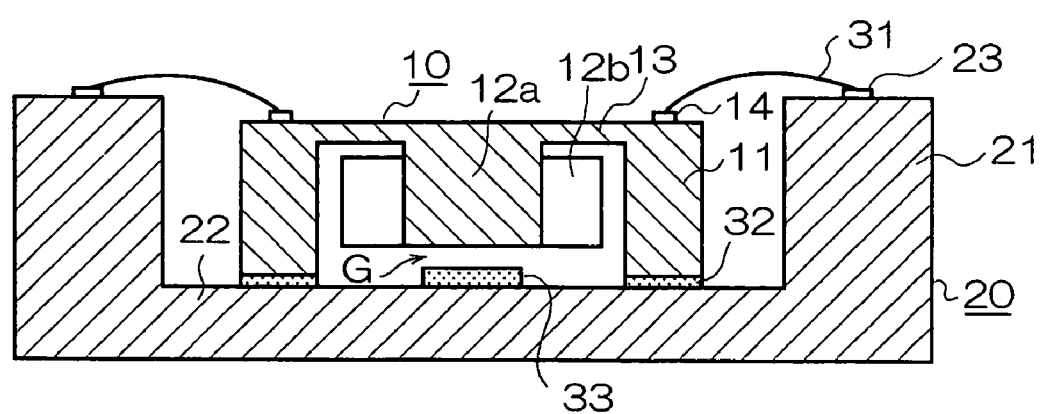
FIG. 1B is a cross-sectional view taken along the line B—B in FIG. 1A.

Referring now to FIGS. 1A and 1B, an accelerometer according to one embodiment of the present invention is shown. This accelerometer has a sensor chip 10 that detects an acceleration, and a receptacle 20 in which the sensor chip 10 is accommodated. The sensor chip 10 is constructed in such a manner that a peripheral frame portion 1, a central weight portion 12a, a peripheral weight portion 12b, and four beam portions 13 which flexibly support the central weight portion 12a on the frame portion 11 are integrally formed by processing a silicon substrate using semiconductor manufacturing technology. The frame portion 11 may be formed into a rectangular parallelepiped that is approximately 1.5 mm by 1.5 mm by 0.6 mm.

The central weight portion 12a has the shape of a square column, and a similar square column-shaped peripheral weight portion 12b is connected to each of four corners of the central weight portion 12a. The four sides on the surface of the central weight portion 12a are connected to the surface of the frame portion 11 by the four beam portions 13 having elasticity, respectively. The frame portion 11 is formed so that the thickness thereof is larger than those of the central weight portion 12a and the peripheral weight portions 12b by 50 µm or thereabouts. In other words, the frame portion 11 is formed such that, when it is placed on a flat plate with the surface of the frame portion 11 facing upward, a gap of approximately 50 µm is produced between the bottom of the central weight portion 12a and the peripheral weight portions 12b, and the flat plate.

Although not illustrated in the drawings, a piezoelectric resistive element, of which electric resistance value varies depending on the amount of deflection occurring in the beam portion 13, is formed on the surface of the beam portion 13.

The piezoelectric resistive element is connected to each of a plurality of pads 14 formed on the surface of the frame 11.

The receptacle 20 is formed by an exterior frame portion 21 and a bottom portion 22 and is formed into an open-topped box having a space that is sufficiently large to accommodate the sensor chip 10. A plurality of pads 23 each corresponding to the pad 14 of the sensor chip 10 is formed on the upper surface of the exterior frame portion 21, and these pads 14, 23 are connected to each other by a wire 31.

The bottom surface of the frame portion 11 of the sensor chip 10 is bonded to the bottom portion 22 within the receptacle 20 by an adhesive portion 32 having a thickness of about 25 μm. As the adhesive portion 32, an adhesive similar to that used as a sealing resin such as epoxy or the like is used. Further, a spacer 33 having a thickness of about 50 μm is simultaneously formed, by applying the same adhesive as the adhesive portion 32, at the central region on the internal bottom portion 22 of the receptacle 20 at a position that faces the lower side of the central weight portion 12a of the sensor chip 10. Accordingly, a gap G of approximately 25 μm is formed between the central weight portion 12a and the spacer 33.

In the aforementioned accelerometer, the sensor chip 10 and the receptacle 20 are produced respectively by separate processes. Subsequently, the adhesive portion 32 and an adhesive that forms the spacer 33 are applied, as one pattern, to the internal bottom portion 22 of the receptacle 20, and the sensor chip 10 is mounted in such a manner that the bottom surface of the frame portion 11 of the sensor chip 10 is disposed in opposing relationship with the adhesive portion 32. Then, when the adhesive is hardened, the sensor chip 10 is fixed to the interior of the receptacle 20, and the spacer 33 is formed at the lower side of the central weight portion 12a with the gap G formed therebetween. Thereafter, the pads 14 and 23 are connected to each other by bonding the wire 31 thereto, thereby completing the accelerometer shown in FIG. 1B.

As described above, the accelerometer of the present embodiment is formed in such a manner that the spacer 33 is disposed in the internal bottom portion 22 within the receptacle 20 at a position directly below the central weight portion 12a. Accordingly, even if the distance between the central weight portion 12a of the sensor chip 10, and the bottom portion 22 of the receptacle 20 is set so as to become large, the spacer 33 prevents movement of the central weight portion 12a. Therefore, there is no danger that the beam portions 13 may be damaged. By setting the distance between the central weight portion 12a and the bottom portion 22 at a large value, there is no possibility that, when the sensor chip 10 is mounted on the receptacle 20, the adhesive seeps out and reaches the lower side of the central weight portion 12a and the peripheral weight portions 12b, thereby causing the weight portions 12a and 12b, and the bottom portion 22 of the receptacle 20 to adhere to each other. As a result, there are offered advantages in that no conventional glass cover is required any more, and an accelerometer that has a small thickness and a high resistance to breakage and that is manufactured at a lower cost can be obtained.

The aforementioned embodiment is intended to demonstrate the technical contents of the invention. Note that the invention should not be narrowly interpreted by being limited only to the aforementioned embodiment, but it could be put into practice using various modifications thereof within the scope of the appended claims. Such modifications are shown below.

Figure 2:
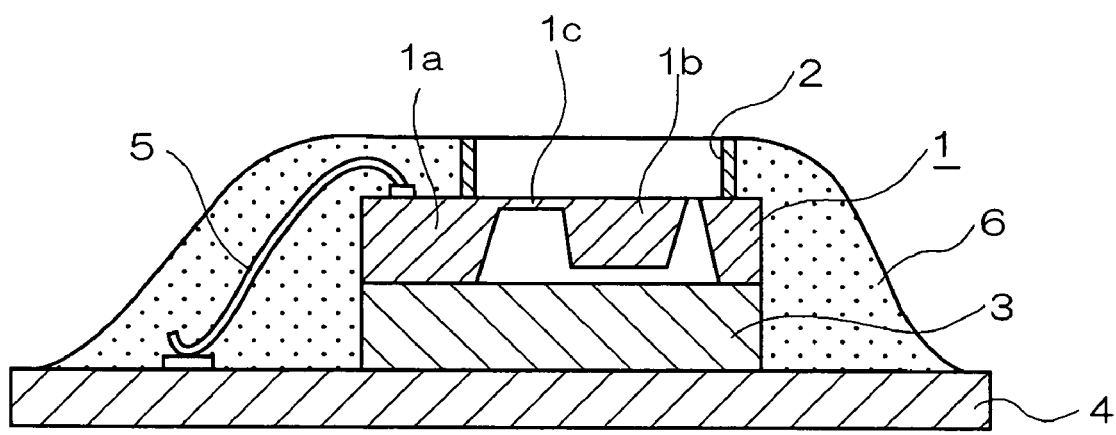
FIG. 2 is a cross-sectional view showing the structure of a conventional accelerometer.

(a) The structure of the sensor chip 10 is not limited to that as exemplified above. For example, the present invention can be applied to the structure shown in FIG. 2 as well.
(b) The receptacle 20 on which the sensor chip 10 is fixedly mounted is not limited to the box-shaped structure as exemplified above. For example, the present invention can be applied to a mounting substrate formed into a flat plate as shown in FIG. 2 as well.
(c) The aforementioned dimensions and materials are not limited to those as exemplified above.

The present invention can be widely used in the industrial fields that apply microelectronics technologies including various types of automatic control systems, measuring systems, information communication systems and the like.

What is claimed is:

1. An accelerometer, comprising:
a sensor chip including a weight portion that detects force imparted from outside, a frame portion that surrounds the weight portion, a beam portion that flexibly supports the weight portion by connecting an upper portion of the weight portion to an upper portion of the frame portion so that a bottom surface of the weight portion is placed at a position higher than a the bottom surface of the frame portion by a predetermined amount, and a sensor element having electric resistance that varies depending on an amount by which the beam portion deflects;
a mounting substrate on which said sensor chip is mounted by fixing the bottom surface of the frame portion of said sensor chip at a predetermined position using an adhesive portion having a first thickness applied thereto; and
a spacer formed from an adhesive applied at a position on a surface of said mounting substrate, which position corresponds to a central position of the weight portion of said sensor chip, by an amount of a second thickness that is larger than said first thickness, with a predetermined gap being formed between the bottom surface of the weight portion and said spacer, said spacer being provided so as to restrict an amount of movement of said weight portion in a downward directions;
wherein the adhesive that forms said spacer, and said adhesive portion, are formed from a same adhesive material, with said spacer and said adhesive portion being formed at a same time.

2. The accelerometer according to claim 1, wherein said spacer is formed from the same adhesive and at the same time as the adhesive portion of the frame portion of said sensor chip in, by applying the adhesive as one pattern.

3. The accelerometer according to claim 1, wherein the sensor chip is formed on a surface of said beam portion and is connected to a connecting pad formed on a surface of said frame portion.

4. The accelerometer according to claim 1, wherein said weight portion, said frame portion, said beam portion and said sensor element of said sensor chip are integrally formed on a semiconductor substrate.

5. The accelerometer according to claim 1, wherein the frame portion of said sensor chip has a thickness that is about 50 μm larger than that of the weight portion, said spacer has a thickness of about 50 μm, the adhesive portion of said frame portion has a thickness of about 25 μm, and a gap formed between the bottom surface of the weight portion and said spacer is about 25 μm.

6. An accelerometer, comprising:
a sensor chip including a weight portion that detects force imparted from outside, a frame portion that surrounds the weight portion, a beam portion that flexibly supports the weight portion by connecting an upper portion of the weight portion to an upper portion of the frame portion so that a bottom surface of the weight portion is placed at a position higher than a bottom surface of the frame portion by a predetermined amount, and a sensor element having electric resistance that varies depending on an amount by which the beam portion deflects;

a receptacle that is formed by an exterior frame portion and a bottom portion and has a space that is large enough to accommodate said sensor chip, in which said sensor chip is mounted and disposed within the space in such a manner that the bottom surface of the frame portion of said sensor chip is fixed to the bottom portion using an adhesive portion having a first thickness applied thereto; and a spacer formed from an adhesive applied at a position on a bottom surface of said receptacle, which position corresponds to a central position of the weight portion of said sensor chip, by an amount of a second thickness that is larger than said first thickness, with a predetermined gap being formed between the bottom surface of the weight portion and said spacer, said spacer being provided so as to restrict an amount of movement of said weight portion in a downward directions;

wherein the adhesive that forms said spacer, and said adhesive portion, are formed from a same adhesive material, with said spacer and said adhesive portion being formed at a same time.

7. The accelerometer according to claim 6, wherein a first connecting pad is provided on an upper surface of the frame portion of said sensor chip, a second connecting pad is provided on an upper surface of the exterior frame portion of said receptacle, and the first connecting pad is connected to the second connecting pad.

8. An accelerometers comprising:

a sensor chip including a square column-shaped central weight portion and square column-shaped peripheral weight portions respectively connected to four corners of the central weight portion, which weight portions are provided for detecting force imparted from an outside, a rectangular parallelepiped-shaped frame portion that surrounds the central weight portion and the peripheral weight portions, four beam portions which flexibly support the central weight portion by connecting upper portions of four sides of the central weight portion respectively to upper portions of four sides of the frame portion so that a bottom surface of the central weight portion is placed at a position higher than a bottom surface of the frame portion by a predetermined amount, and a sensor element whose electric resistance value varies depending on an amount by which the beam portions deflect, all of which components are integrally formed on a semiconductor substrate;

a mounting receptacle formed by an exterior frame portion and a bottom portion and having a space that is large enough to accommodate said sensor chip, said receptacle being provided in such a manner that said sensor chip is disposed and mounted in the space by fixing the bottom surface of the frame portion of said sensor chip at a predetermined position on a surface of the bottom portion using an adhesive portion having a first thickness applied thereto; and a spacer formed, from an adhesive, and having a second thickness larger than said first thickness, at a position on the surface of the bottom portion surface of said receptacle, which position corresponds to a central position of the central weight portion of said sensor chip, with a predetermined gap being formed between the bottom surface of the central weight portion and said spacer, said spacer being provided so as to restrict an amount of movement of said central weight portion in a downward directions, wherein the adhesive that forms said spacer, and said adhesive portion, are formed from a same adhesive material, with said spacer and said adhesive portion being formed at a same time, and as one pattern.

9. The accelerometer according to claim 8, wherein said mounting receptacle is a box-shaped receptacle having an open top side.

* * * * *